United States Patent [19]
Hubele

[11] 3,856,973
[45] Dec. 24, 1974

[54] CONTROL OF ACARINAE WITH CARBAMATES HAVING AN OXIME ETHER FUNCTION

[75] Inventor: Adolf Hubele, Riehen near Basel, Switzerland

[73] Assignee: Ciba-Geigy, Limited A. G., Basel, Switzerland

[22] Filed: Aug. 24, 1973

[21] Appl. No.: 391,442

Related U.S. Application Data
[60] Division of Ser. No. 195,822, Nov. 4, 1971, Pat. No. 3,772,385, which is a continuation-in-part of Ser. No. 786,762, Dec. 24, 1968, abandoned.

[30] Foreign Application Priority Data
Jan. 5, 1968    Switzerland............................ 121/68

[52] U.S. Cl............. 424/300, 260/472, 260/482 C, 71/106, 71/111
[51] Int. Cl............................................ A01n 9/20
[58] Field of Search ....... 260/472; 424/300; 71/106, 71/111

[56] References Cited
UNITED STATES PATENTS
3,492,333    1/1970    Dickore .............................. 260/472

*Primary Examiner*—Vincent D. Turner
*Attorney, Agent, or Firm*—Frederick H. Rabin

[57] ABSTRACT

The invention relates to new oxime ethers of the formula

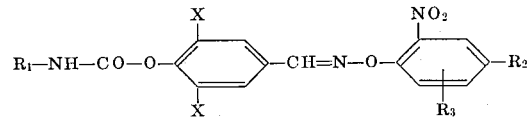

wherein $R_1$, $R_2$, $R_3$ and X have the meanings given below. Said oxime ethers are used in herbicidal preparations for controlling undesired plant growth in cultures of cereals, maize, rice and soya. Some of these ethers can also be used for combatting pests of the order acarinae.

3 Claims, No Drawings

CONTROL OF ACARINAE WITH CARBAMATES HAVING AN OXIME ETHER FUNCTION

CROSS REFERENCE

This is a division of application Ser. No. 195,822, filed on Nov. 4, 1971, now U.S. Pat. No. 3,772,385, which in turn is a continuation-in-part of application Ser. No. 786,762 filed on Dec. 24, 1968, now abandoned.

The present invention relates to active substances for compositions for controlling undesirable plant growth in cultures of useful plants, such as cereals, maize, rice and soya and some of these compounds are also useful for combatting pests of the order acarinae (mites, ticks etc.).

The active substances are compounds of the formula I

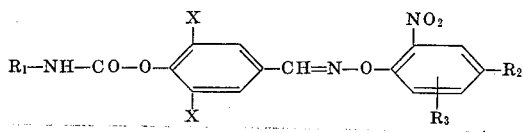

wherein $R_1$ is a lower alkyl radical, with one to four carbon atoms, which is unsubstituted or substituted by a chlorine atom, a phenyl radical that is unsubstituted or mono to trisubstituted by members of the group consisting of halogen atoms, methyl, methoxy, trifluoromethyl or nitro groups, or $R_1$ is the benzyl phenylethyl or cyclohexyl radical;

$R_2$ is a nitro, formyl, methoxycarbonyl or di-lower alkyl sulfamyl radical, wherein the lower alkyl groups have one to four carbon atoms;

$R_3$ is a hydrogen or chlorine atom, a lower alkyl, lower alkoxy group with one to four carbon atoms, the methoxycarbonyl or di-methylsulfamyl group and X are identical and represent chlorine, bromine or iodine atoms.

In these definitions under "lower alkyl" groups with one to four carbon atoms, the straight chained or branched radicals methyl, ethyl, n-propyl, isopropyl, n-butyl, isobutyl, sec. butyl and tert.butyl are understood.

The present invention claims the new oxime-ether-carbamates of formula I.

The invention at the same time claims pesticides which contain compounds of formula I as active substances together with suitable carriers.

The new compounds are produced by known methods according to following indication:

The starting products of formula II

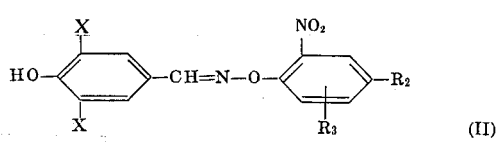

which are necessary for the manufacture of the compounds of formula I can be manufactured in a simple manner, for example from 3,5-dihalogeno-4-hydroxybenzyldoxime and an appropriately substituted chlorobenzene of formula

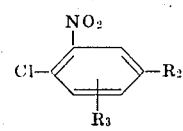

in alkaline solution.

If these compounds of formula II are to be converted to esters of general formula I then, provided the reaction is not too drastic, all usual esterification methods can be applied to the conversion of the phenolic OH group. In order to ensure mild conditions, it is appropriate to start from the phenolate and to react with appropriate carboxylic acid halides. It is also possible to produce the phenylester grouping at temperatures in the range of 0° to 160° C with carboxylic acids or carboxylic acid anhydrides, with acid esters or lactones or in individual cases also with ketenes.

For converting the starting products II to the corresponding carbamates, the phenolic OH group can be reacted according to usual methods with isocyanates of the type

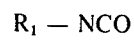

$$R_1 - NCO$$

or with compounds which can transiently form these isocyanates, or also with carbamic acid chlorides of the type $$R_1 - NH - COCl$$

or of the type

$$R_1 - N(CH_3) - COCl$$

It is however also possible first to manufacture the corresponding phenolchlorocarbonate from the OH group by means of $COCl_2$ and then to allow this, where possible, to react with an amine $R_1-NH_2$ or $R_1-N-H-CH_3$.

$R_1$ in each case has the significance given for formula I. Possible solvents are generally acetonitrile, ether, dioxane, dimethylformamide, dimethylsulphoxide and others.

The herbicidal selectivity in varieties of grain, maize and rice on the one hand and in leguminosae (peas, beans, soya beans, clover and lucerne) on the other, on post-emergent treatment, follows for all compounds of formula I from the field of use initially quoted, though to different extents. Particularly outstanding representatives are those of general formula III

wherein $R_1$ and X have the significance given initially and Ar especially represents the following substituted phenyl groups:

| Ar |
|---|
| 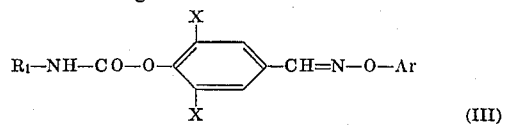 |

—Continued

| Ar |
|---|
| $O_2N$–C₆H₃(NO₂)–CHO |
| $O_2N$–C₆H₃(NO₂)–COOCH₃ |
| $O_2N$–C₆H₃(NO₂)–SO₂–N(CH₃)₂ |
| $O_2N$–C₆H₃(NO₂)–SO₂–N(C₃H₇)₂ |
| $O_2N$–C₆H₂(NO₂)(Alkyl)–NO₂ |
| $O_2N$–C₆H₂(NO₂)(COOCH₃)–NO₂ |
| $O_2N$–C₆H₂(NO₂)(N(CH₃)₂)–NO₂ |
| $O_2N$–C₆H₂(NO₂)(O–Alkyl)–NO₂ |

The acaricidal action of a series of representatives of formula I, which has been observed against all kinds of representatives of the order Acarina such as ticks, mites, spinning mites and the like, should also be emphasised. Here it is worth mentioning that the amounts used can be chosen at an order of magnitude which lies below any influence on the plants.

Typical representatives of this are compounds of formula III wherein Ar denotes the group

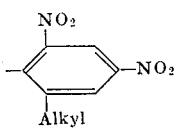

In the formulae quoted "alkyl" is intended to represent lower, including branched alkyl residues having at most four C atoms.

The new oxime-ether-carbamates can be used alone or mixed with other pesticides or biologically stimulating or inhibiting substances or with solid carriers, solvents, diluents, thickeners, dispersing agents, wetting agents or adhesives or optionally with the addition of fertilisers.

Depending on the end use, the new substances can be used as pesticides in various ways such as form part of the state of the art and are for example described in U.S. Pat. No. 3,329,702 or British Pat. No. 1,047,644 or Swiss Pat. No. 424,359.

In many cases it is advantageous to use granules to achieve uniform release of active substances over a longer period of time. These granules can for example be manufactured by dissolving the active substance in an organic solvent, absorbing this solution by a granulated material, for example Attapulgite or SiO₂, and removing the solvent.

In the form of one or other use such materials can also be applied by distribution over large areas (spraying, dusting and the like) by means of aircraft.

The various use forms of such materials can be more closely suited to the end uses in the usual manner by adding substances which improve the distribution, adhesion, rain resistance and possibly the penetrating power, such as for example fatty acids, resins, wetting agents, glue, caseine or alginates.

In the manufacture of herbicidally active materials there are furthermore numerous possible components for use in combinations, of which the most important representatives are quoted below:
N-phenyl-N', N'-dimethylurea, N-p-chlorophenyl-N', N'-dimethylurea, N-3,4-dichlorophenyl-N', N'-dimethylurea, N-3,4-dichlorophenyl-N'-methoxy-N'-methylurea, N-4-bromo-3-chlorophenyl-N'-methoxy-N'-methylurea, trichloracetic acid, 2,6-dichlorobenzonitrile, 2,3,6-trichlorobenzoic acid, 2,4-D, 2,4,5-T, MCPB, MCPP, isopropyl-carbanilate, isopropyl-3-chlorocarbanilate, N-3-chlorophenylcarbamic acid 4'-chlorobutin-2-yl-1-ester, 2,3,6-trichlorophenylacetic acid and salts, 2-chlorodiallylacetamide, 2-chloro-4,6-bis-ethylamino-s-triazine, 2-methoxy-4,6-bis-ethylamino-s-triazine, 2-azido-4-methyl-thio-6-isopropylaminotriazine, the monomethylarsenate di-Na salt, various arsenites, Na metaborate, Na chlorate and sulphamic acid.

When using the materials against ectoparasites on farm animals such as cattle, sheep, goats and others, it is advantageous to use dipping baths in which the active substances are present alone or, as described, in an emulsified or dispersed form.

In the following text the parts denote parts by weight.

Example 1

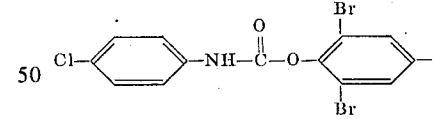

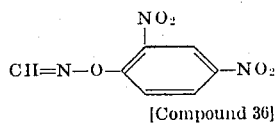

[Compound 36]

120 parts of 3,5-dibromo-4-hydroxybenzaldoxime-O-2',4'-dinitrophenyl ether are suspended in 800 parts by volume of ethyl acetate whilst stirring and 41 parts of 4-chlorophenylisocyanate in 200 parts by volume of ethyl acetate are added at 50° C. The weakly exothermic reaction is initiated by adding 0.1 parts of triethylene diamine. After standing for 4 hours at room temperature the mixture is filtered and the product digested with hot acetonitrile and again filtered.
Melting point: 194°–195° C (decomposition).

The following compounds of the type of

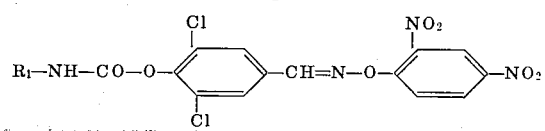

are obtained in an analogous manner.

| Compound No. | R₁ | Melting point, °C. (decomposition) |
|---|---|---|
| 1 | CH₃— | 201–201 |
| 2 | C₂H₅— | 197–199 |
| 3 | n-C₃H₇— | 193–194 |
| 4 | iso-C₃H₇— | 194–197 |
| 5 | Cl—CH₂—CH₂— | 190–192 |
| 6 | C₆H₅— (phenyl) | 193–194 |
| 7 | 2,4,5-trichlorophenyl | 186–187 |
| 8 | 2,4-dichlorophenyl | 187–190 |
| 9 | 2,6-dimethylphenyl | 160–163 |
| 10 | 2-chlorophenyl | 178–179 |
| 11 | 4-chlorophenyl | 195–196.5 |
| 12 | 2-methylphenyl | 166–168 |
| 13 | 4-methylphenyl | 169–170 |
| 14 | 2-trifluoromethylphenyl | 190–191.5 |
| 15 | 4-trifluoromethylphenyl | 194–196 |
| 16 | 3,4-dichlorophenyl | 192–193 |
| 17 | 2-chloro-4-bromophenyl | 186–188 |
| 18 | 2,5-dichlorophenyl | 170–175 |
| 19 | 3-chloro-2-methylphenyl (approx) | 169–171 |
| 20 | 3-bromo-4-methylphenyl (approx) | 176–178 |
| 21 | 4-bromophenyl | 192–194 |

— Continued

| Compound No. | R₁ | Melting point, °C. (decomposition) |
|---|---|---|
| 22 | 2-methoxyphenyl | 164–168 |
| 23 | 4-methoxyphenyl | — |
| 24 | benzyl (—CH₂—C₆H₅) | — |
| 25 | phenethyl (—CH₂—CH₂—C₆H₅) | — |
| 26 | H (cyclohexyl) | — |

The following compounds of the type of

R₁—NH—CO—O—(2,6-dibromophenyl)—CH=N—O—(2,4-dinitrophenyl)

are obtained in an analogous manner.

| Compound No. | R₁ | Melting point, °C. (decomposition) |
|---|---|---|
| 27 | CH₃— | 205–206 |
| 28 | C₂H₅— | 198–199 |
| 29 | n-C₃H₇— | 196–197 |
| 30 | iso-C₃H₇— | 193–196 |
| 31 | n-C₄H₉— | 186–187 |
| 32 | ClCH₂—CH₂— | 195–196 |
| 33 | phenyl | 180–182 |
| 34 | 2-chlorophenyl | 176–177 |
| 35 | 3-chlorophenyl | 185–186.5 |
| 36 | 4-chlorophenyl | 194–195 |
| 37 | 2-methylphenyl | 171–173 |
| 38 | 4-methylphenyl | 179–181 |
| 39 | 2-trifluoromethylphenyl | 177–179 |
| 40 | 4-trifluoromethylphenyl | 182–183 |
| 41 | 3,4-dichlorophenyl | 197–199 |
| 42 | 2-chloro-4-bromophenyl | 202–203 |

— Continued

| Compound No. | R₁ | Melting point, °C (decomposition) |
|---|---|---|
| 43 | 2,6-dichlorophenyl | 177–178 |
| 44 | 2-chloro-4-trifluoromethylphenyl | 179–181 |
| 45 | 2-chloro-6-methylphenyl | 186–188 |
| 46 | 2,4-dimethylphenyl | 173–175 |
| 47 | 2-chloro-4-methylphenyl | 174–176 |
| 48 | 2-chloro-4-nitrophenyl | 175–179 |
| 49 | 2,4,6-trichlorophenyl | 187–188 |

In a similar manner the compound of formula

No. 50

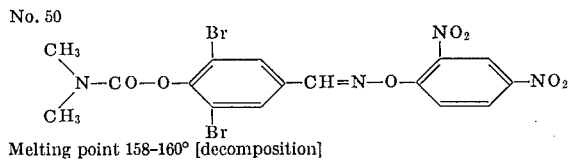

Melting point 158–160° [decomposition]

is obtained by reacting the Na salt of 3,5-dibromo-4-hydroxybenzaldoxime-O-2',4'-dinitrophenyl ether with dimethylcarbamoyl chloride.

The following compounds of the type of

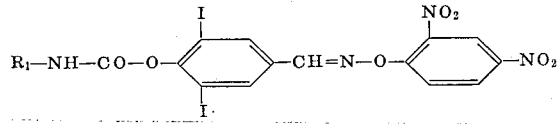

are obtained in an analogous manner to that which has been described for the manufacture of compound 36.

| Compound No. | R₁ | Melting point, °C (decomposition) |
|---|---|---|
| 51 | CH₃— | 207–208 |
| 52 | C₂H₅— | 202–204 |
| 53 | n-C₃H₇— | 199–200 |
| 54 | Cl—CH₂—CH₂— | 206–207 |
| 55 | phenyl | 207–208 |
| 56 | 3-chlorophenyl | 197–199 |
| 57 | 4-chlorophenyl | 206–207 |

| Compound No. | R₁ | Melting point, °C (decomposition) |
|---|---|---|
| 58 | 4-methylphenyl | 197–199 |
| 59 | 2-trifluoromethylphenyl | 178–180 |
| 60 | 4-trifluoromethylphenyl | 197–198 |
| 61 | 2,4-dichlorophenyl | 203–204 |
| 62 | 2-chloro-4-bromophenyl | 197–199 |
| 63 | 2,4-dichlorophenyl (isomer) | 184–186 |
| 64 | 2-chloro-4-methylphenyl | 192–193 |
| 65 | 2-methyl-4-bromophenyl | 188–190 |
| 66 | 2-chloro-4-trifluoromethylphenyl | 178–181 |
| 67 | 2,4,6-trichlorophenyl | 193–195 |

The following compounds of the type of

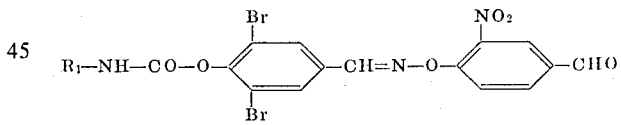

are obtained in an analogous manner

| Compound No. | R₁ | Melting point, °C (decomposition) |
|---|---|---|
| 68 | CH₃— | 198–199 |
| 69 | C₂H₅— | 180–181 |
| 70 | 4-chlorophenyl | 179–180 |
| 71 | 2-trifluoromethylphenyl | 182–184 |
| 72 | 3-chlorophenyl | 175–176 |
| 73 | 2,4-dichlorophenyl | 176–177 |

—Continued

| Compound No. | R₁ | Melting point, °C. (decomposition) |
|---|---|---|
| 74 | (2,4,5-trichlorophenyl) | 180–181 |

The following compounds are obtained in an analogous manner

No. 75

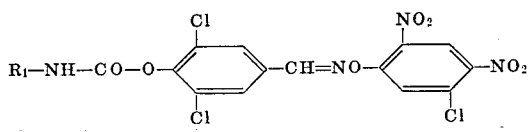

Melting point 124–126° C. (decomposition).

No. 76

CH₃—NH—CO—O—(2,6-diiodophenyl)—CH=N—O—(2-methyl-4,6-dinitrophenyl)

Melting point 173–174° C. (decomposition).

The following compounds of the type of

R₁—NH—CO—O—(2,6-dichlorophenyl)—CH=N—O—(2,4-dinitro-6-chlorophenyl)

are obtained in an analogous manner

| Compound No. | R₁ | Melting point, °C. (decomposition) |
|---|---|---|
| 77 | CH₃— | 185–188 |
| 78 | ClCH₂—CH₂— | 180–182 |
| 79 | phenyl | 174–177 |
| 80 | 4-Cl-phenyl | 173–175 |
| 81 | 2,4-Cl₂-phenyl | 163–165 |
| 82 | 4-F₃C-phenyl | 182–184 |
| 83 | 3-F₃C-phenyl | 176–178 |
| 84 | 3-Cl-phenyl | 171–173 |
| 85 | 2,4,5-Cl₃-phenyl | 164–166 |

The following compounds of the type of

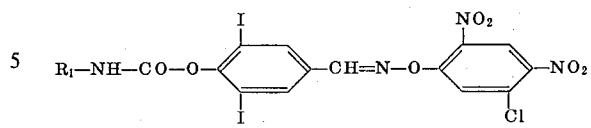

are obtained in an analogous manner

| Compound No. | R₁ | Melting point, °C. (decomposition) |
|---|---|---|
| 86 | CH₃— | 200–210 |
| 87 | ClCH₂CH₂— | 206–207 |
| 88 | 4-Cl-phenyl | 187–189 |
| 89 | 3-CF₃-phenyl | 186–188 |
| 90 | 4-CF₃-phenyl | 191–193 |
| 91 | 2,4-Cl₂-phenyl | 187–189 |

The following compounds of the type of

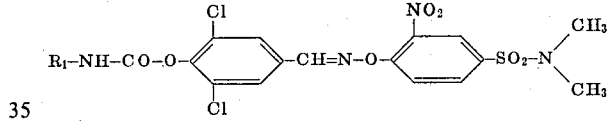

are obtained in an analogous manner

| Compound No. | R₁ | Melting point, °C. (decomposition) |
|---|---|---|
| 92 | CH₃— | 180–181 |
| 93 | 3-F₃C-phenyl | 171–173 |
| 94 | 2,4-Cl₂-phenyl | 177–178 |

The following compounds of the type of

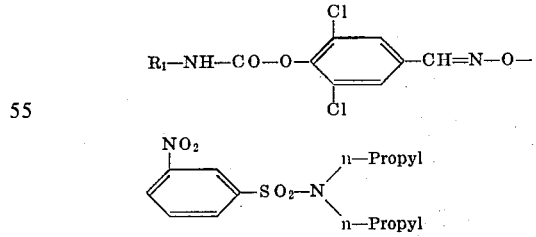

are obtained in an analogous manner

| Compound No. | R₁ | Melting point, °C. (decomposition) |
|---|---|---|
| 95 | CH₃ | 187–188 |
| 96 | 2,4-Cl₂-phenyl | 173–174 |

The following compounds of the type of

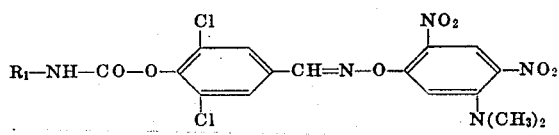

are obtained in an analogous manner

| Compound No. | R₁ | Melting point, °C. (decomposition) |
|---|---|---|
| 97 | CH₃— | 182–183 |
| 98 | Cl—CH₂—CH₂— | 170–172 |
| 99 | Cl—⟨phenyl⟩— | 161–162 |
| 100 | 2,4-Cl₂—⟨phenyl⟩— | 173–174 |
| 101 | CF₃—⟨phenyl⟩— | 162–163 |

The following compounds of the type of

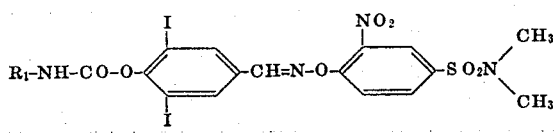

are obtained in an analogous manner

| Compound No. | R₁ | Melting point, °C. (decomposition) |
|---|---|---|
| 102 | CH₃— | 192–193 |
| 103 | ⟨phenyl⟩— | 180–182 |
| 104 | Cl—⟨phenyl⟩— | 183–184 |
| 105 | 2,4-Cl₂—⟨phenyl⟩— | 179–181 |

The following compounds of the type of

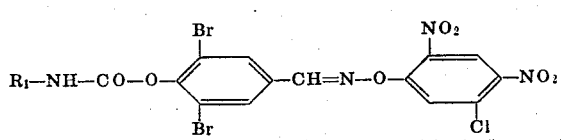

are obtained in an analogous manner

| Compound No. | R₁ | Melting point, °C (decomposition) |
|---|---|---|
| 106 | Cl—CH₂—CH₂— | 189–190 |
| 107 | C₆H₅— | 184–185 |
| 108 | Cl—⟨phenyl⟩— | 183–184 |
| 109 | Cl—⟨phenyl⟩— | 188–190 |
| 110 | CH₃—⟨phenyl⟩— | 177–178 |

| Compound No. | R₁ | Melting point, °C. (decomposition) |
|---|---|---|
| 111 | F₃C—⟨phenyl⟩— | 163–164 |
| 112 | 2,4-Cl₂—⟨phenyl⟩— | 179–180 |

The following compounds of the type of

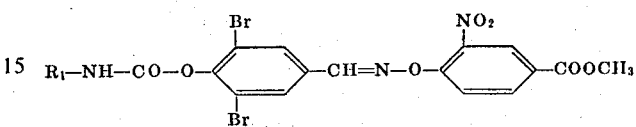

are obtained in an analogous manner

| Compound No. | R₁ | Melting point, °C. (decomposition) |
|---|---|---|
| 113 | CH₃— | 165–167 |
| 114 | Cl—⟨phenyl⟩— | 167–169 |
| 115 | 2,4-Cl₂—⟨phenyl⟩— | 165–166 |
| 116 | CF₃—⟨phenyl⟩— | 168–170 |
| 117 | 2,4,Cl₃—⟨phenyl⟩— | 174–175 |

The following compounds of the type of

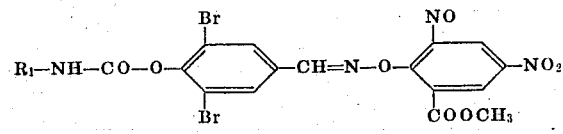

are obtained in an analogous manner

| Compound No. | R₁ | Melting point, °C. (decomposition) |
|---|---|---|
| 118 | CH₃— | 181–182 |
| 119 | Cl—CH₂—CH₂— | 148–149.5 |
| 120 | Cl—⟨phenyl⟩— | 165–166 |
| 121 | Cl—⟨phenyl⟩— | 178–179 |
| 122 | 2,4-Cl₂—⟨phenyl⟩— | 161–163 |
| 123 | 2,4-Cl₂—⟨phenyl⟩— | 165–167 |

—Continued

| Compound No. | R₁ | Melting point, °C. (decomposition) |
|---|---|---|
| 124 | (phenyl with CF₃) | 145–146 |
| 125 | F₃C–(phenyl)– | 175–176 |

EXAMPLE 2

Examples of Formulations

Dusting Agents

Equal parts of an active substance according to the invention and of precipitated silica are finely ground. Dusting agents which preferably contain 1–6 % of active substance can be manufactured therefrom by mixing with kaolin or talc.

Spraying Powders

In order to manufacture a spraying powder the following components are for example mixed and finely ground: 50 parts of active substance according to the present invention, 20 parts of Hisil (highly adsorptive silica), 25 parts of bolus alba (Kaolin), 3.5 parts of a reaction product of p-tert. octylphenol and ethylene oxide and 1.5 parts of sodium 1-benzyl-2-stearyl-benzimidazole-6,3-disulphonate.

Emulsion Concentrate

Easily soluble active substances can also be formulated as an emulsion concentrate in accordance with the following instructions: 20 parts of active substance, 70 parts of xylene and 10 parts of a mixture of a reaction product of an alkylphenol with ethylene oxide and calcium dodecylbenzene-sulphonate are mixed. On dilution with water to the desired concentration a sprayable emulsion results.

EXAMPLE 3

Selective herbicidal action

The compounds encompassed by formula I show a good action in combatting dicotyledon plants in the post-emergent treatments.

The treatment of the experimental field with active substances according to the invention is carried out 12 days after sowing, when the plants have developed one to two new leaves after emerging. The amounts used are 2, 1 and 0.5 kg of active substance per hectare.

The results are presented in the three tables which follow. As shown by the results, the compounds mentioned are throughout suitable for combatting dicotyledon plants in varieties of grain. Wheat, barley, oats and maize are completely spared by almost all compounds. Some compounds are tolerated by soya and flax cultures. The compounds 27, 33, 35, 38, 39, 40, 49, 72, 73, 113, 114, 116 and 118 are tolerated by rice. The active substances 89 and 91 only affect rice plants slightly but destroy the well-known rice weed Panicum.

The following ratings are applicable to the assessment in the tables: 1–2 = no action, 3–4 = slight damage, 5–7 = severe damage and 8–9 = plant died.

Table 1

| Variety of Plant | Compound No. 27 | Compound No. 33 | Compound No. 35 | Compound No. 36 | Compound No. 37 | Compound No. 38 | Compound No. 39 | Compound No 41 | Compound No. 47 | Compound No. 49 |
|---|---|---|---|---|---|---|---|---|---|---|
| Triticum | 1 | 1 | 1 | 1 | 1 | 1 | 1 | 1 | 1 | 1 |
| Hordeum | 1 | 1 | 1 | 1 | 1 | 1 | 1 | 1 | 1 | 1 |
| Zea | 1 | 1 | 1 | 1 | 1 | 1 | 1 | 1 | 1 | 1 |
| Oryza | 2 | 1 | 1 | 3 | 3 | 1 | 1 | 4 | 3 | 1 |
| Sorghum | 1 | 1 | 1 | 1 | 1 | 1 | 1 | 1 | 2 | 1 |
| Panicum | 3 | 1 | 1 | 3 | 1 | 1 | 1 | 2 | 1 | 1 |
| Beta vulg. | 9 | 9 | 9 | 9 | 9 | 9 | 9 | 9 | 9 | 9 |
| Galium | 9 | 9 | 4 | 9 | 6 | 9 | 8 | 9 | 9 | 3 |
| Calendula | 9 | 9 | 9 | 9 | 9 | 9 | 9 | 9 | 9 | 9 |
| Alopercurus | — | — | — | — | — | 9 | 9 | 9 | 9 | 9 |
| Chrysanthemum | 9 | 9 | 9 | 9 | 9 | 9 | 9 | 9 | 9 | 9 |
| Linum | 5 | 2 | 1 | 4 | 2 | 3 | 3 | 2 | 4 | 2 |
| Brassica | 9 | 9 | 9 | 9 | 9 | 9 | 9 | 9 | 9 | 5 |
| Ipomoea | 4 | 3 | 5 | 8 | 6 | 4 | 3 | 6 | 5 | 2 |
| Daucus | 5 | 3 | 5 | 8 | 6 | 5 | 3 | 6 | 5 | 1 |
| Soya | 3 | 3 | 2 | 4 | 2 | 2 | 2 | 2 | 3 | 1 |

Use amounts: 1 kg of active substance/hectare

Table 1a

| Variety of Plant | cpd. 29 | cpd. 31 | cpd. 34 | cpd. 44 | cpd. 45 | cpd. 46 | cpd. 48 | cpd. 51 | cpd. 53 | cpd. 54 | cpd. 55 | cpd. 57 | cpd. 58 |
|---|---|---|---|---|---|---|---|---|---|---|---|---|---|
| Triticum | 1 | 1 | 1 | 1 | 1 | 1 | 1 | 1 | 1 | 1 | 1 | 1 | 1 |
| Hordeum | 1 | 1 | 1 | 1 | 1 | 1 | 1 | 1 | 1 | 1 | 1 | 1 | 1 |
| Avena | 1 | 1 | 1 | 1 | 1 | 1 | 1 | 1 | 1 | 1 | 1 | 1 | 1 |
| Zea | 1 | 1 | 1 | 1 | 1 | 1 | 1 | 1 | 1 | 1 | 1 | 1 | 1 |
| Oryza | 4 | 1 | 1 | 1 | 2 | 1 | 1 | 1 | 4 | 5 | 3 | 1 | 3 |
| Digitaria | 1 | 1 | 1 | 1 | 1 | 1 | 1 | 1 | 1 | 1 | 1 | 1 | 1 |
| Sorghum | 1 | 1 | 1 | 1 | 1 | 1 | 1 | 1 | 3 | 2 | 2 | 1 | 2 |
| Panicum | 1 | 1 | 1 | 2 | 1 | 1 | 1 | 1 | 3 | 2 | 1 | 1 | 4 |
| Poa | 1 | 1 | 1 | 1 | 1 | 1 | 1 | 1 | 1 | 1 | 1 | 1 | 1 |
| Alopecurus | 1 | 1 | 1 | 1 | 1 | 1 | 1 | 1 | 2 | 1 | 2 | 1 | 1 |
| Cyperus veg. | 1 | 1 | 1 | 1 | 1 | 1 | 1 | 1 | 1 | 1 | 1 | 1 | 1 |
| Cynodon veg. | 1 | 1 | 1 | 1 | 1 | 1 | 1 | 1 | 1 | 1 | 1 | 1 | 1 |
| Beta | 9 | 9 | 9 | 9 | 9 | 9 | 9 | 9 | 9 | 9 | 9 | 9 | 9 |
| Galium | 9 | 6 | 5 | 7 | 9 | 4 | 4 | 7 | 5 | 5 | 3 | 3 | 4 |
| Calendula | 9 | 9 | 5 | 9 | 9 | 9 | 7 | 5 | 5 | 6 | 4 | 9 | 9 |
| Chrysanthemum | 9 | 9 | 9 | 9 | 9 | 6 | 7 | 8 | 8 | 9 | 9 | 9 | 7 |
| Linum | 1 | 4 | 3 | 2 | 3 | 9 | 1 | 4 | 5 | 7 | 5 | 8 | 7 |
| Brassica | 9 | 9 | 9 | 9 | 9 | 1 | 9 | 8 | 9 | 9 | 9 | 9 | 9 |

Table 1a—Continued

| Variety of Plant | cpd. 29 | cpd. 31 | cpd. 34 | cpd. 44 | cpd. 45 | cpd. 46 | cpd. 48 | cpd. 51 | cpd. 53 | cpd. 54 | cpd. 55 | cpd. 57 | cpd. 58 |
|---|---|---|---|---|---|---|---|---|---|---|---|---|---|
| Ipomea | 2 | 1 | 2 | 3 | 3 | 1 | 1 | 4 | 5 | 1 | 8 | 4 | 3 |
| Stellaria | 3 | 6 | 5 | — | — | 3 | 4 | 7 | 5 | 9 | 6 | 7 | 9 |
| Soja | 3 | 1 | 3 | 3 | 4 | 3 | 1 | 3 | 4 | 4 | 4 | 2 | 3 |
| Gossypium | 8 | 9 | 9 | — | — | 9 | 9 | 9 | 5 | 9 | 5 | 7 | 9 |
| Amaranthus | 2 | 5 | 3 | — | — | 3 | 4 | 9 | 9 | 9 | 9 | 1 | 9 |

Use amounts: 1 kg of active substance/hectare

Table 1b

| Variety of Plant | cpd. 60 | cpd. 66 | cpd. 68 | cpd. 69 | cpd. 71 | cpd. 74 | cpd. 76 | cpd. 79 | cpd. 80 | cpd. 82 | cpd. 83 | cpd. 84 | cpd. 85 | cpd. 92 |
|---|---|---|---|---|---|---|---|---|---|---|---|---|---|---|
| Triticum | 1 | 1 | 1 | 1 | 1 | 1 | 1 | 1 | 1 | 4 | 1 | 1 | 3 | 1 |
| Hordeum | 1 | 1 | 1 | 1 | 1 | 1 | 1 | 1 | 1 | 1 | 1 | 1 | 1 | 1 |
| Avena | 1 | 1 | 1 | 1 | 1 | 1 | 1 | 1 | 1 | 1 | 1 | 1 | 1 | 1 |
| Zea | 1 | 1 | 1 | 1 | 1 | 1 | 1 | 1 | 1 | 1 | 1 | 1 | 1 | 1 |
| Oryza | 1 | 3 | 3 | 3 | 3 | 1 | 1 | 1 | 1 | 1 | 1 | 1 | 1 | 1 |
| Digitaria | 1 | 1 | 1 | 1 | 1 | 1 | 1 | 1 | 1 | 1 | 1 | 1 | 1 | 1 |
| Sorghum | 1 | 3 | 1 | 1 | 1 | 1 | 1 | 1 | 1 | 1 | 1 | 1 | 1 | 1 |
| Panicum | 1 | 1 | 1 | 2 | 4 | 4 | 1 | 1 | 1 | 1 | 1 | 1 | 1 | 1 |
| Poa | 1 | 3 | 1 | 2 | 1 | 2 | 1 | 1 | 1 | 1 | 1 | 1 | 1 | 1 |
| Alopecurus | 1 | 2 | 3 | 1 | 1 | 2 | 1 | 1 | 1 | 1 | 1 | 1 | 1 | 1 |
| Cyperus veg. | 1 | 1 | 1 | 1 | 1 | 1 | 1 | 1 | 1 | 1 | 1 | 1 | 1 | 1 |
| Cynodon veg. | 1 | 1 | 1 | 1 | 1 | 1 | 1 | 1 | 1 | 1 | 1 | 1 | 1 | 1 |
| Beta | 9 | 9 | 9 | 9 | 9 | 9 | 9 | 9 | 9 | 9 | 9 | 9 | 9 | 9 |
| Galium | 4 | 4 | 4 | 9 | 4 | 1 | 3 | 2 | 3 | 1 | 1 | 1 | 1 | 1 |
| Calendula | 4 | 7 | 9 | 9 | 7 | 9 | 9 | 6 | 9 | 9 | 9 | 7 | 9 | 9 |
| Chrysanthemum | 8 | 6 | 9 | 9 | 9 | 9 | 9 | 9 | 9 | 9 | 9 | 9 | 9 | 9 |
| Linum | 3 | 6 | 4 | 6 | 5 | 5 | 8 | 4 | 3 | 4 | 2 | 4 | 3 | 5 |
| Brassica | 9 | 9 | 9 | 9 | 9 | 9 | 9 | 9 | 5 | 5 | 3 | 9 | 4 | 9 |
| Ipomoea | 5 | 4 | 4 | 9 | 5 | 4 | 4 | 1 | 3 | 2 | 1 | 1 | 1 | 3 |
| Stellaria | 4 | 9 | 5 | 9 | 9 | 5 | 7 | 9 | 9 | 9 | 9 | 7 | 9 | 2 |
| Soja | 4 | 4 | 4 | 4 | 6 | 4 | 2 | 3 | 2 | 2 | 1 | 2 | 2 | 1 |
| Gossypium | 8 | 7 | 9 | 9 | 9 | 9 | 7 | 9 | 7 | 8 | 7 | 5 | 6 | 6 |
| Amaranthus | 8 | 9 | 8 | 1 | 6 | 7 | — | 3 | — | — | — | 1 | — | 3 |

Use amounts: 1 kg of active substance/hectare

Table 1c

| Variety of Plant | cpd. 111 | cpd. 112 | cpd. 115 | cpd. 117 |
|---|---|---|---|---|
| Triticum | 1 | 1 | 1 | 3 |
| Hordeum | 1 | 1 | 1 | 1 |
| Avena | 1 | 1 | 1 | 3 |
| Zea | 1 | 1 | 1 | 1 |
| Oryza | 1 | 1 | 1 | 1 |
| Digitaria | 1 | 1 | 1 | 1 |
| Sorghum | 1 | 1 | 1 | 1 |
| Panicum | 1 | 1 | 1 | 1 |
| Poa | 1 | 1 | 1 | 1 |
| Alopecurus | 1 | 1 | 1 | 1 |
| Cyperus veg. | 1 | 1 | 1 | 1 |
| Cynodon veg. | 1 | 1 | 1 | 1 |
| Beta | 9 | 9 | 9 | 9 |
| Galium | 1 | 1 | 1 | 7 |
| Calendula | 9 | 9 | 6 | 9 |
| Chrysanthemum | 9 | 9 | 9 | 7 |
| Linum | 5 | 6 | 5 | 3 |
| Brassica | 9 | 5 | 9 | 9 |
| Ipomoea | 1 | 1 | 6 | 4 |
| Stellaria | 9 | 5 | 8 | 5 |
| Soja | 2 | 3 | 4 | 3 |
| Gossypium | 9 | 7 | 9 | 9 |
| Amaranthus | 5 | 3 | — | — |

Use amounts: 1 kg of active substance/hectare

| Compound No. | 1.0 kg of active substance/hectare | | | | | | | | | | | 0.5 kg of active substance/hectare | | | | |
|---|---|---|---|---|---|---|---|---|---|---|---|---|---|---|---|---|
| | Triticum | Hordeum | Avena | Zea | Oryza | Calendula | Chrysanthemum | Linum | Brassica | Stellaria | Soja | Calendula | Chrysanthemum | Linum | Brassica | Stellaria | Soja |
| 70 | 1 | 1 | 1 | 1 | 3 | 9 | 9 | 9 | 9 | 8 | 4 | 9 | 9 | 5 | 9 | 7 | 4 |
| 73 | 1 | 1 | 1 | 1 | 2 | 9 | 9 | 5 | 9 | 9 | 5 | 9 | 9 | 4 | 9 | 7 | 3 |

— Continued

| Compound No. | \multicolumn{10}{c|}{1.0 kg of active substance/hectare} | \multicolumn{6}{c}{0.5 kg of active substance/hectare} |
|---|---|---|---|---|---|---|---|---|---|---|---|---|---|---|---|---|
| | Triticum | Hordeum | Avena | Zea | Oryza | Calendula | Chrysanthemum | Linum | Brassica | Stellaria | Soja | Calendula | Chrysanthemum | Linum | Brassica | Stellaria | Soja |
| 72 | 1 | 1 | 1 | 1 | 2 | 9 | 9 | 6 | 9 | 9 | 5 | 9 | 9 | 4 | 9 | 7 | 4 |
| 113 | 3 | 1 | 1 | 1 | 1 | 9 | 9 | 4 | 9 | 9 | 4 | 9 | 9 | 3 | 9 | 9 | 3 |
| 114 | 1 | 1 | 1 | 1 | 1 | 9 | 9 | 3 | 9 | 9 | 3 | 9 | 9 | 3 | 9 | 9 | 3 |
| 116 | 3 | 1 | 3 | 1 | 1 | 9 | 9 | 3 | 9 | 9 | 3 | 9 | 9 | 3 | 9 | 9 | 3 |
| 118 | 1 | 1 | 1 | 1 | 1 | 9 | 9 | 5 | 9 | 9 | 4 | 9 | 9 | 3 | 9 | 9 | 3 |
| 119 | 1 | 1 | 1 | 1 | 3 | 9 | 9 | 6 | 9 | 9 | 3 | 9 | 9 | 5 | 9 | 9 | 3 |
| 120 | 1 | 1 | 1 | 1 | 3 | 9 | 9 | 4 | 9 | 9 | 3 | 9 | 9 | 4 | 9 | 9 | 2 |
| 121 | 1 | 1 | 1 | 1 | 3 | 9 | 9 | 7 | 9 | 9 | 3 | 9 | 5 | 6 | 9 | 9 | 2 |
| 122 | 1 | 1 | 1 | 1 | 3 | 9 | 9 | 5 | 9 | 9 | 4 | 9 | 9 | 4 | 9 | 9 | 3 |
| 123 | 1 | 4 | 1 | 1 | 3 | 9 | 9 | 4 | 7 | 9 | 4 | 9 | 9 | 4 | 7 | 9 | 3 |
| 124 | 1 | 1 | 1 | 1 | 3 | 9 | 9 | 6 | 9 | 9 | 5 | 9 | 9 | 4 | 6 | 9 | 4 |
| 125 | 1 | 1 | 1 | 1 | 3 | 9 | 9 | 4 | 9 | 9 | 4 | 9 | 9 | 4 | 9 | 9 | 3 |

| Compound number | \multicolumn{11}{c}{2 kg. of active substance/hectare} |
|---|---|---|---|---|---|---|---|---|---|---|---|
| | Triticum | Hordeum | Avena | Zea | Oryza | Soja | Galium | Calendula | Chrysanthemum | Linum | Brassica |
| 91 | 1 | 1 | 2 | 3 | 3 | 3 | — | 9 | 9 | 9 | 9 |
| 88 | 1 | 1 | 1 | 1 | 4 | 3 | 9 | 9 | 9 | 9 | 9 |
| 86 | 1 | 1 | 1 | 1 | 4 | 2 | 9 | 9 | 9 | 9 | 9 |
| 87 | 1 | 1 | 1 | 1 | 4 | 3 | 9 | 9 | 9 | 9 | 9 |
| 89 | 2 | 1 | 2 | 1 | 3 | 3 | 9 | 9 | 9 | 9 | 9 |
| 40 | | | | | | | | | | | |
| 104 | | | | | | | | | | | |
| 63 | | | | | | | | | | | |
| 64 | | | | | | | | | | | |
| 102 | | | | | | | | | | | |
| 103 | | | | | | | | | | | |
| 105 | | | | | | | | | | | |
| 65 | | | | | | | | | | | |
| 90 | | | | | | | | | | | |

| Compound number | \multicolumn{11}{c}{1 kg. of active substance/hectare} |
|---|---|---|---|---|---|---|---|---|---|---|---|
| | Triticum | Hordeum | Avena | Zea | Oryza | Soja | Galium | Calendula | Chrysanthemum | Linum | Brassica |
| 91 | 1 | 1 | 1 | 2 | 3 | 2 | — | 9 | 9 | 9 | 9 |
| 88 | 1 | 1 | 1 | 1 | 4 | 2 | 9 | 9 | 9 | 9 | 9 |
| 86 | 1 | 1 | 1 | 1 | 3 | 2 | 6 | 9 | 9 | 9 | 9 |
| 87 | 1 | 1 | 1 | 1 | 4 | 2 | 3 | 9 | 9 | 8 | 9 |
| 89 | 1 | 1 | 2 | 1 | 3 | 3 | 9 | 9 | 9 | 9 | 9 |
| 40 | 1 | 1 | 1 | 1 | 1 | 3 | 9 | 9 | 9 | 6 | 9 |
| 104 | 1 | 1 | 1 | 1 | 3 | 3 | 8 | 6 | 9 | 4 | 9 |
| 63 | 1 | 1 | 1 | 1 | 2 | 3 | 7 | 7 | 9 | 7 | 9 |
| 64 | 1 | 1 | 2 | 1 | 4 | 4 | 6 | 9 | 9 | 9 | 9 |
| 102 | 1 | 1 | 1 | 1 | 4 | 4 | 9 | 9 | 9 | 9 | 9 |
| 103 | 1 | 1 | 1 | 1 | 3 | 3 | 5 | 6 | 8 | 5 | 9 |
| 105 | 1 | 1 | 1 | 1 | 5 | 2 | 9 | 9 | 9 | 9 | 9 |
| 65 | 1 | 1 | 1 | 1 | 4 | 3 | 6 | 9 | 9 | 7 | 9 |
| 90 | 1 | 1 | 1 | 1 | 4 | 3 | 5 | 9 | 7 | 5 | 9 |

For comparative purposes the results obtained in this test with previously known substances with partly similar chemical structure are shown in Table II.

The compounds thus tested are (A) 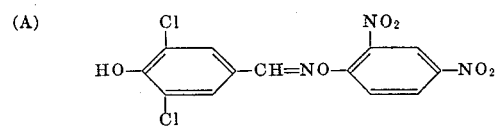

known from the French Pat. No. 1,494,078

(B) 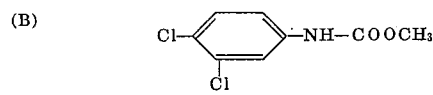

methyl-3,4-dichloro-carbanilate known from the U.S. Pat. No. 3,116,995 and (C) 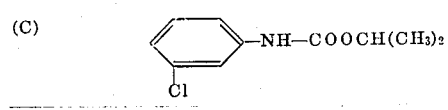

isopropyl-N-(3-chlorophenyl)carbamate, known under the tradename CIPC.

| Variety of plant | \multicolumn{6}{c}{compound} |
|---|---|---|---|---|---|---|
| | \multicolumn{2}{c}{A} | \multicolumn{2}{c}{B} | \multicolumn{2}{c}{C} |
| | \multicolumn{6}{c}{Amount applied in kg/ha} |
| | 2 | 1 | 2 | 1 | 2 | 1 |
| Triticum | 1 | 1 | 2 | 1 | 3 | 2 |
| Hordeum | 1 | 1 | 2 | 1 | 3 | 2 |
| Avena | 1 | 1 | 2 | 1 | 5 | 4 |
| Zea | 1 | 1 | 3 | 2 | 5 | 4 |
| Oryza | 1 | 1 | 2 | 1 | 2 | 2 |
| Digitaria | 1 | 1 | 3 | 2 | 4 | 2 |
| Sorgum | 1 | 1 | 2 | 2 | 2 | 1 |
| Panicum | 1 | 1 | 3 | 2 | 3 | 2 |
| Poa | 1 | 1 | 7 | 4 | 5 | 5 |
| Alopecurus | 1 | 1 | 3 | 1 | 5 | 5 |
| Cyperus veg. | 1 | 1 | 1 | 1 | 1 | 1 |
| Cynodon veg. | 1 | 1 | — | — | 1 | 1 |
| Beta | 9 | 9 | 9 | 9 | 5 | 3 |
| Galium | 4 | 2 | 3 | 1 | 4 | 3 |
| Calendula | 9 | 9 | 2 | 2 | 2 | 1 |
| Chrysanthemum | 9 | 9 | 2 | 2 | 1 | 1 |
| Linum | 9 | 9 | 9 | 4 | — | — |
| Sinapis | — | — | — | — | 4 | 4 |
| Brassica | 9 | 9 | 9 | 4 | 4 | 3 |
| Ipomoea | 2 | 1 | 7 | 5 | 3 | 3 |
| Stellaria | 5 | 3 | 9 | 4 | 5 | 4 |
| Soya | 4 | 4 | 7 | 4 | 4 | 3 |
| Gossypium | 3 | 3 | 3 | 3 | 3 | 2 |
| Amaranthus | 4 | 3 | 8 | 4 | 1 | 1 |

EXAMPLE 4

Several compounds of the present application were compared in a field test with the compound (A) 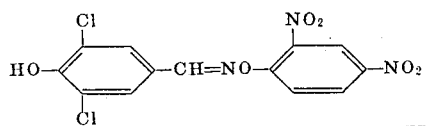

known from the French Pat. No. 1,494,078.

In an open field, small lots were seeded with the culture crop, peas, soya, summer and winter wheat. Two weeks after sowing, when the plants had reached the 2 – 3 leaf stage, they were sprayed with the testing liquor, so that the final amount of active substance applied corresponded to 1 respectively 2 kg per hectare.

The testing liquor consisted of a 1% sprayable dispersion obtained from the following composition by dilution with water:
  50% of one of the active compounds to be tested
  33.5% of Bolus alba (kaolin)
  11% of the ammonium salt of ligninsulfonic acid
  4.5% of sodium dinaphtylmethanedisulfonate (product commercially available under the tradename "Neradol").

The assessment of the test was made 4 weeks after the treatment and the plants were evaluated according to the following key:

| note: | crop: | weed: |
|---|---|---|
| 1 (optimum) | no damage, as control | plants killed |
| 2 – 4 | slight coverable damage | heavy damage |
| 5 – 8 | heavy irreversible damage | slight recoverable damage |
| 9 | plant killed | no damage, same as untreated control |

The results are given in the following table.

One note is given for the crop, another for the evaluation of the weeds in that particular lot in general and a third one for the problem weed in each individual lot.

| compound tested | A | | 65 | | 40 | | 63 | | 64 | | 92 | |
|---|---|---|---|---|---|---|---|---|---|---|---|---|
| concentration applied in kg/ha | 1 | 2 | 1 | 2 | 1 | 2 | 1 | 2 | 1 | 2 | 1 | 2 |
| crop : soya | | | 6 | 4 | 5 | 4 | 3 | 4 | | | | |
| weeds in general | | | 6 | 3 | 6 | 5 | 4 | 3 | | | | |
| crop : winter wheat | 1 | | 1 | | 1 | 2 | 1 | | 1 | | | |
| weeds in general | 6 | 3 | 4 | 4 | 5 | 3 | | | | | | |
| veronica arvensis | 9 | 2 | 6 | 1 | 2 | 2 | | | | | | |
| crop : sommer wheat | 1 | 1 | 1 | 1 | 1 | 1 | 1 | 1 | 2 | 1 | 1 | |
| weeds in general | 5 | 4 | 4 | 3 | 3 | 4 | 3 | 3 | 4 | 3 | 2 | 2 |
| rumex acetosella | 5 | 5 | 4 | 1 | 3 | 4 | 2 | 1 | 3 | 1 | 1 | 1 |

In these field tests, in post emergence application of 1 and/or 2 kg per hectare, the compounds of the present application show selective herbicidal activity in crops of soya and excellent selective herbicidal activity in crops of summer and winter wheat.

The compound "A" according to the French Pat. No. 1,494,231 shows in the same tests no selective herbicidal activity in soya and though it is very compatible towards wheat, its weed controlling ability is not satisfactory.

EXAMPLE 5

In order to test the acaricidal action, phaseolus plants in the two-leaf stage are infested, 12 hours before the treatment, by placing pieces of leaf attacked by spinning mites on them. After 12 hours a population in all stages of development is present on the test plant.

The active substance No. 75 was sprayed in the form of an emulsion onto the plant through a fine atomiser in such a way that a uniform deposit of droplets was produced on the surface of the leaf. After 7 days the mortality was determined and expressed as a percentage. The following mortality values were determined for two varieties of spinning mite after 2 and 7 days:

a) Tetranychus urticae

| Concentration [ppm] | Adults | | Larvae | | Eggs |
|---|---|---|---|---|---|
| | 2 Days | 7 Days | 2 Days | 7 Days | 7 Days |
| 800 | 100% | 80% | 100% | 80% | 60% |
| 400 | 80% | 80% | 80% | 80% | 60% |
| 200 | 60% | 0% | 60% | 60% | 0% |
| 100 | 0% | | 0% | 0% | | b) Tetranychus telarius

| Concentration [ppm] | Adults | | Larvae | | Eggs |
|---|---|---|---|---|---|
| | 2 Days | 7 Days | 2 Days | 7 Days | 7 Days |
| 800 | 100% | 80% | 100% | 80% | 60% |
| 400 | 80% | 80% | 100% | 80% | 60% |
| 200 | 60% | 60% | 80% | 60% | 60% |
| 100 | 0% | 0% | 0% | 0% | |

What we claim is:

1. A method for combating pests of the order acarinae comprising applying to sites infested with such pests an acaricidally effective amount of a compound of the formula

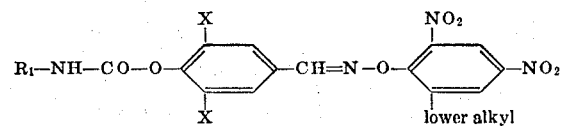

wherein $R_1$ is lower alkyl with one to four carbon atoms which is unsubstituted or substituted by a chlorine atom, phenyl which is unsubstituted or mono to trisubstituted by members selected from the group consisting of halogen, methyl, methoxy, trifluoromethyl and nitro, or $R_1$ is benzyl, phenylethyl or cyclohexyl; and X represents chlorine, bromine or iodine.

2. The method according to claim 1 wherein the pests are ticks or mites.

3. The method according to claim 1 in which the compound is

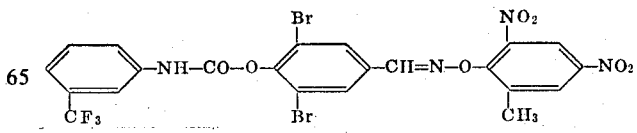

* * * * *